No. 880,689. PATENTED MAR. 3, 1908.
W. M. McDOUGALL & S. R. V. ROBINSON.
PRIMARY BATTERY.
APPLICATION FILED MAR. 9, 1907.
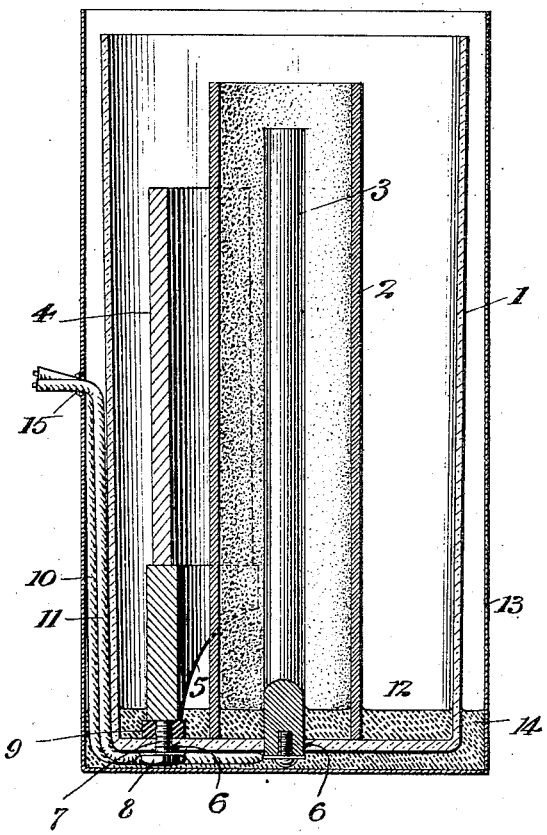
Witnesses:
Inventors
William M. McDougall and
Stanley R. V. Robinson.
By their Attorneys
Rosenbaum & Stockbridge

UNITED STATES PATENT OFFICE.

WILLIAM M. McDOUGALL, OF EAST ORANGE, NEW JERSEY, AND STANLEY R. VALENTINE ROBINSON, OF NEW YORK, N. Y.

PRIMARY BATTERY.

No. 880,689.

Specification of Letters Patent.

Patented March 3, 1908.

Application filed March 9, 1907. Serial No. 361,577

*To all whom it may concern:*

Be it known that we, WILLIAM M. McDOUGALL and STANLEY R. VALENTINE ROBINSON, a citizen of the United States, and a subject of the King of Great Britain, respectively, residing at East Orange, county of Essex, and State of New Jersey, and borough of Brooklyn, city and State of New York, respectively, have invented certain new and useful Improvements in Primary Batteries, of which the following is a full, clear, and exact description.

Our invention relates to electric batteries, the principal object being to improve, cheapen and simplify certain features of construction, to avoid local action, and generally make the battery more efficient, durable and easily handled in use.

All satisfactory primary batteries require a porous cell to keep the exciting and depolarizing fluids of the electrolyte separate. These have commonly been made of earthenware received loosely in the outer containing cell. It is evident that the lack of permanent connection between the inner and outer cells renders the battery liable to breakage. The elements of the battery have also been loosely inserted from the top of the cell where they are more or less in the way when refilling the battery, and are further exposed to the corrosive fumes which arise from the surface of the electrolyte.

By the present invention we propose to have all of the parts, including both of the elements of the battery and the porous cell beneath the surface of the liquid, and to have the connections firmly anchored at the bottom of the cell and at a point where they are not exposed to the corrosive fumes from the electrolyte, and are not in the way when the battery is being refilled. For this purpose we support the various parts directly from the bottom of the cell, leading the circuit wire connections through the material thereof.
The parts are firmly held by cement or pitch which also seals all the openings and protects the connections. This construction also keeps the elements entirely submerged beneath the surface of the fluid, which is an important advantage in practice, because the surface action of the electrolyte on the elements is very corrosive, so that they are generally eaten through at this point and destroyed before they are consumed or exhausted.

Our invention consists therefore in the features of construction and combination by which the foregoing purposes and objects are attained, as will be hereinafter more fully set forth, and finally particularly pointed out in the appended claims.

The drawing shows a sectional view of a battery embodying the principles of our invention.

Referring to the drawing, 1 denotes a cup cell or receptacle, which is conveniently of glass, and which may be an ordinary tall glass tumbler. 2 indicates a porous tube which is best made of unglazed earthenware of slightly less height than that of the containing vessel 1. 3 and 4 are the elements of the cell for which we employ carbon and zinc respectively. All of these parts are held from the bottom of the containing vessel 1 in the following way:

The jar or vessel 1 has holes 6, drilled through its bottom wall. The element 3 projects through one of these openings, and through the other there projects a ledge or support 5 of copper or copper composition which supports the zinc element. Local action between this copper support and the zinc element 4 which rests upon it is prevented by the quick polarization of the copper support, since this part is not exposed to the action of the de-polarizer hereinafter described. This ledge or support is shown with a screw 7, nut 8, and washer 9, for holding it rigidly to the bottom of the cell. Such fastening means is not, however, absolutely necessary. The circuit connections are made by the wires 10 and 11, with the element 3 and the ledge or support 4, which therefore constitute the electric terminals, at the bottom of the cell. Thereafter a quantity of pitch or cement 12 is poured in so as to firmly engage and hold all the parts in their proper relation, as shown in the drawing. The zinc element 4 is merely a plate of arcuate form, dropped in the cell so as to rest on the ledge 5 and make electric contact therewith.

In practice we find it very important to have the ledge 5 extend upward in the slot at least one-fifth of the normal height of the electrolyte level therein. This is because the crystals at the bottom of the cell produce a very strong solution thereat which would produce intense local action unless the contacting point between the zinc element and its copper support were raised above the level of this strong portion of the solution.

The porous tube 2 surrounds the element 3 and separates it from the element 4. The porous tube and element 3 are conveniently placed concentrically in the cell. It will be noted that the pitch or cement 12 flows around and among all the parts and covers the bottom of the cell so that the elements and the porous tube are not only fixed in place, but the porous tube is effectually made a porous cup, and the elements are sealed into their place so that escape of the fluid is prevented.

While any desired electrolytes may be used we find the following solutions to give very satisfactory results in practice: For the exciting fluid outside the porous cell, sulfuric acid and water; for the depolarizing fluid within the porous cell, sulfuric acid, nitrate of soda and water.

For the purposes of protecting the glass jar or vessel 1, it is best to have an outside casing 13, which may be part of the receptacle or installation in which the battery is to be placed. The battery is firmly fixed in the casing 13 by flowing pitch or cement 14 around the jar 1 within the casing. The circuit wires 10 and 11 can be led out through a wall of the casing at any convenient point 15. In use the battery is merely filled full of the necessary electrolytes, which are very conveniently supplied, since the upper part of the cell is entirely open. The parts 2, 3 and 5 are firmly held by the body of cement or pitch at the bottom of the cell so that there is no looseness and rattling and liability to breakage. The elements are in the most advantageous position within the electrolyte, that is, beneath the surface thereof when the solution is too weak, and yet supported away from the bottom so as to be free from the deposits and crystals which settle there, when the solution is too strong. All connections being made at the bottoms of the cells, it is evident that they can be conveniently made in groups with their upper edges in a common plane, so that a common gasket sheet, or packing, may be clamped on a number of cells simultaneously, as shown in patent to Robinson, #554,427, February 11, 1896.

What we claim, is:—

A battery having a jar or vessel having a central perforation at its lower face, a carbon rod extending through said perforation and projecting upward into the cell, a metallic support larger at its upper surface than at its base and also projecting through the bottom of said jar and extending upward for substantially one-fifth of the normal fluid level therein corresponding to the abnormally strong portion of the electrolyte which is found around the crystals at the bottom of the cell, a porous tube interposed between said support and said carbon rod, a layer of cement completely surrounding said support, said tube and said rod and overlying the bottom of the jar, and a zinc element resting on said support, said zinc element being of less height than the central rod and porous tube, whereby the zinc element is maintained at the central portion of the electrolyte without being exposed to the especially corrosive action thereof at its surface and at its bottom layers.

In witness whereof, we subscribe our signatures, in the presence of two witnesses.

WILLIAM M. McDOUGALL.
S. R. VALENTINE ROBINSON.

Witnesses:
 WALDO M. CHAPIN,
 MAY BIRD.